United States Patent
Ha et al.

(10) Patent No.: US 7,329,377 B2
(45) Date of Patent: Feb. 12, 2008

(54) CYCLIC SHRINKAGE OF A TEMPLATED 3D NETWORK MATERIAL

(75) Inventors: Yung-Hoon Ha, Springfield, VA (US); Edwin L. Thomas, Natick, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 366 days.

(21) Appl. No.: 10/799,160

(22) Filed: Mar. 12, 2004

(65) Prior Publication Data
US 2005/0200047 A1 Sep. 15, 2005

(51) Int. Cl.
*B29C 33/76* (2006.01)
(52) U.S. Cl. .................. 264/317; 264/342 R
(58) Field of Classification Search .......... 264/29.1, 264/401, 604, 299, 317; 427/255.12; 977/788, 977/791, 840
See application file for complete search history.

(56) References Cited

U.S. PATENT DOCUMENTS

| | | | |
|---|---|---|---|
| 4,981,820 A | 1/1991 | Renlund et al. | |
| 5,043,002 A | 8/1991 | Dobbins et al. | |
| 5,128,494 A | 7/1992 | Blum | |
| 5,180,694 A | 1/1993 | Renlund et al. | |
| 5,266,533 A | 11/1993 | Leung et al. | |
| 5,328,976 A | 7/1994 | Leung et al. | |
| 5,980,813 A * | 11/1999 | Narang et al. | 264/401 |
| 6,139,626 A * | 10/2000 | Norris et al. | 428/323 |
| 6,146,567 A | 11/2000 | Sachs et al. | |
| 6,261,469 B1 * | 7/2001 | Zakhidov et al. | 216/56 |

(Continued)

OTHER PUBLICATIONS

Li, et al., "Nanoparticle Inks for Directed Assembly of Three-Dimensional Periodic Structures," *Advanced Materials*, 15(19):1639-43 (2003).

(Continued)

*Primary Examiner*—Christina Johnson
*Assistant Examiner*—Keith Godfrey
(74) *Attorney, Agent, or Firm*—Sutherland Asbill & Brennan LLP (57) ABSTRACT

Methods are provided for producing a shrunken replica or a shrunken inverse replica of a multicontinuous structure. In one embodiment, the method comprises (1) infiltrating a first multicontinuous structure with a first fluid material which can be immobilized and shrunken, wherein the first multicontinuous structure comprises at least a first phase and a second phase which is immiscible with the first phase, and the infiltration displaces the second phase in the first multicontinuous structure to form a second multicontinuous structure which comprises at least the first phase and a third phase which consists of the first fluid material; (2) immobilizing the infiltrated first fluid material in the second multicontinuous structure; (3) removing the first phase from the second multicontinuous structure; and (4) shrinking (e.g., by a pyrolysis process) the third phase of the second multicontinuous structure, to produce an isotropically shrunken inverse replica of the first multicontinuous structure.

42 Claims, 3 Drawing Sheets

U.S. PATENT DOCUMENTS

| | | | | |
|---|---|---|---|---|
| 6,433,931 | B1* | 8/2002 | Fink et al. | 359/586 |
| 6,517,763 | B1* | 2/2003 | Zakhidov et al. | 264/344 |
| 6,530,958 | B1 | 3/2003 | Cima et al. | |
| 6,680,013 | B1* | 1/2004 | Stein et al. | 264/44 |
| 6,858,079 | B2* | 2/2005 | Norris et al. | 117/70 |
| 6,991,847 | B2* | 1/2006 | Padmanabhan et al. | 428/316.6 |
| 2003/0006534 | A1* | 1/2003 | Taboas et al. | 264/401 |
| 2003/0148088 | A1* | 8/2003 | Padmanabhan et al. | 428/304.4 |

OTHER PUBLICATIONS

Park, et al., "Synthesis of Single Crystals of Calcite with Complex Morphologies," *Advanced Materials*, 14(16):1167-69 (2002).

Sandhage, et al., "Novel, Bioclastic Route to Self-Assembled, 3D, Chemically Tailored Meso/Nanostructures: Shape-Preserving Reactive Conversion of Biosilica (Diatom) Microshells," *Advanced Materials*, 14(6):429-33 (2002).

* cited by examiner

CYCLIC SHRINKAGE OF A TEMPLATED 3D NETWORK MATERIAL

STATEMENT REGARDING FEDERALLY SPONSORED RESEARCH OR DEVELOPMENT

This invention was made with government support under Contract No. F49620-01-1-0509 awarded by the Air Force. The government has certain rights in the invention.

BACKGROUND OF THE INVENTION

This invention is generally in the field of fabrication processes for making structures having features of complex shapes and patterns in small feature sizes.

The field of nanotechnology has led to various fabrication methods to produce miniature-sized features. Examples of the prominent nanotechnologies include microphotonics, electronics, and MEMS, and nanomechanics. In all of these technologies, producing materials with small feature sizes typically are critical to the successful implementation of an intended product.

For example, photonic crystals ("PCs") are a new class of optical devices for microscopic confinement and manipulation of electromagnetic radiation. Periodic dielectric crystals can exhibit bandgaps that prohibit the propagation of a certain set of frequencies of light in a manner analogous to electronic bandgaps in semiconductors. The limitation and difficulty of implementing this technology lies, for example, in the fabrication of small size features in complex three dimensional ("3D") patterns, such as to make 3D PCs suitable for operating at visible and infrared wavelengths.

Current 3D fabrication technologies include (i) lithographic techniques where 3D structures are built up of successive two dimensional ("2D") structures, (ii) self-assembly techniques where colloids, surfactants, zeolites, or block copolymers have been formed into desired structures and, in some cases, one component etched out and the resulting empty space backfilled with a different (high index) component, and (iii) a holographic process where the structures are built through polymerization of a monomer at specific interference patterns. These techniques, however, have various limitations. Lithographic processes are inherently a 2D process, and the fabrication of 3D structures via lithography involves painstaking efforts. Self-assembly techniques are limited to certain structures that are energetically favorable and by the inherent size scale of the self-assembling moieties. Holographic processes possess an upper limit to the maximum size features that can be obtained due to the utilization of interference of laser beams of particular wavelengths $\lambda$ and available photoresists for $\lambda$.

It would be desirable to provide fabrication methods for making complicated 3D structures from a variety of materials having complex smaller scale size features, for example with periodic spacings of well-defined, micron and sub-micron scale sizes. It would also be desirable, for example, to provide a fabrication process in which a larger template structure is made by a relatively simple, conventional technique, such as 3D printing, and then replicate the structure at arbitrarily smaller size scales.

SUMMARY OF THE INVENTION

Methods are provided for producing a shrunken replica or a shrunken inverse replica of a multicontinuous structure. In one aspect, the method comprises (1) infiltrating a first multicontinuous structure with a first fluid material which can be immobilized and shrunken, wherein the first multicontinuous structure comprises at least a first phase and a second phase which is immiscible with the first phase, and the infiltration displaces the second phase in the first multicontinuous structure to form a second multicontinuous structure which comprises at least the first phase and a third phase which consists of the first fluid material; (2) immobilizing the infiltrated first fluid material in the second multicontinuous structure; (3) removing the first phase from the second multicontinuous structure; and (4) shrinking the third phase of the second multicontinuous structure, to produce an isotropically shrunken inverse replica of the first multicontinuous structure. In one embodiment, the volume of the inverse replica is between about 1% and about 90% of the volume of the first multicontinuous structure.

In one embodiment, the method further includes (5) infiltrating the shrunken inverse replica with a second fluid material which can be immobilized, wherein the shrunken inverse replica comprises at least a first phase and a second phase which is immiscible with the first phase, and the infiltration displaces the second phase of the shrunken inverse replica to form a third multicontinuous structure which comprises the first phase and a third phase which consists of the second fluid material which is immiscible with the first phase; and (6) immobilizing the infiltrated second fluid material in the third multicontinuous structure. A further step in this particular method can include removing the first phase from the third multicontinuous structure, to produce an isotropically shrunken direct replica of the first multicontinuous structure.

Still further possible steps in this method include infiltrating the isotropically shrunken direct replica with a third fluid material which can be immobilized and shrunken, wherein the shrunken replica comprises at least a first phase and a second phase which is immiscible with the first phase, and the infiltration displaces the second phase in the shrunken replica; immobilizing the infiltrated third fluid material in the shrunken replica; removing at least the first phase from the shrunken replica; and shrinking the third phase of the shrunken replica, to produce a second isotropically shrunken inverse replica of the first multicontinuous structure.

In various embodiments of the method, the multicontinuous structure is an ordered bicontinuous structure or a disordered bicontinuous structure. In exemplary embodiments, the first multicontinuous structure can be formed by a molding process, a solid free form fabrication process, or a biological process.

In one embodiment of the method, removal of the first phase from the second multicontinuous structure comprises removing the first phase with a solvent which is a nonsolvent for the third phase. In another embodiment, removal of the first phase from the second multicontinuous structure comprises a process selected from UV degradation, ozone etching, reactive ion etching, chemical etching, and laser ablation.

In one embodiment, shrinking of the third phase of the second multicontinuous structure comprises pyrolysis of the third phase. For example, the third phase can comprise polydimethylsiloxane such that the pyrolysis step converts the polydimethylsiloxane to a silicon oxycarbide.

In one embodiment, infiltration of the first fluid material comprises a gas phase deposition process. In various embodiments of the method, the second phase is air or another gas and the infiltration is conducted under vacuum conditions.

In another aspect, a method is provided for producing a shrunken replica of a bicontinuous structure, which includes the steps of (1) infiltrating a first bicontinuous structure with a first fluid material which can be immobilized, wherein the first bicontinuous structure comprises a first phase and a second phase which is immiscible with the first phase, the backfilling displacing the second phase in the first bicontinuous structure to form a second bicontinuous structure which comprises the first phase and a third phase which consists of the first fluid material which is immiscible with the first phase; (2) immobilizing the infiltrated first fluid material in the second bicontinuous structure; (3) removing the first phase from the second bicontinuous structure, to produce an inverse replica of the first bicontinuous structure; (4) infiltrating the inverse replica with a second fluid material which can be immobilized and shrunken, wherein the inverse replica comprises at least a first phase and a second phase which is immiscible with the first phase, and the infiltration displaces the second phase of the inverse replica to form a third bicontinuous structure which comprises the first phase and a third phase; (5) immobilizing the infiltrated second fluid material in the third bicontinuous structure; (6) removing the first phase from the third bicontinuous structure; and (7) shrinking the third phase of the third bicontinuous structure, to produce an isotropically shrunken replica of the first bicontinuous structure. In one embodiment, the volume of the shrunken replica is between about 1% and about 90% of the volume of the first bicontinuous structure.

In one embodiment, the method further includes infiltrating the shrunken replica with a third fluid material which can be immobilized, wherein the shrunken replica comprises at least a first phase and a second phase which is immiscible with the first phase, and the infiltration displaces the second phase of the shrunken replica to form a fourth bicontinuous structure which comprises the first phase and a third phase; and immobilizing the infiltrated third fluid material in the fourth bicontinuous structure. In one embodiment, the method further comprises removing the first phase from the fourth bicontinuous structure, to produce an isotropically shrunken inverse replica of the first bicontinuous structure.

In exemplary embodiments, the first bicontinuous structure is formed by a molding process, a solid free form fabrication process, or a biological process.

In various embodiments, the first fluid material, which is immobilized and shrunken, comprises a monomer or other polymer precursor. For example, the polymer precursor can comprise an organometallic precursor or can be a precursor of polysilazanes, poly(isopropyliminoalane), or polyborosiloxanes. In one embodiment, the polymer precursor includes dimethyl siloxane. In these methods, the immobilization can, for example, comprise polymerizing or crosslinking the monomer or polymer precursor.

In various embodiments, the second fluid material can comprise a molten metal or semi-metal. In such embodiments, the immobilization can, for example, comprises freezing the metal or semi-metal. In another embodiment, the second fluid material comprises a monomer or other polymer precursor. Optionally, the first fluid material and the third fluid material each comprise the same polymer precursor.

In one embodiment of the method, removal of the first phase from the second multicontinuous structure comprises removing the first phase with a solvent that is a nonsolvent for the third phase. In another embodiment, removal of the first phase from the second multicontinuous structure comprises a process selected from UV degradation, ozone etching, reactive ion etching, chemical etching, and laser ablation.

In one embodiment, shrinking of the third phase of the second multicontinuous structure comprises pyrolysis of the third phase. For example, the third phase can comprise polydimethylsiloxane such that the pyrolysis step converts the polydimethylsiloxane to a silicon oxycarbide.

In one embodiment, infiltration of the first fluid material comprises a gas phase deposition process. In various embodiments of the method, the second phase is air or another gas and the infiltration is conducted under vacuum conditions.

In one embodiment of the method, removal of the first phase from the second bicontinuous structure comprises removing the first phase with a solvent that is a nonsolvent for the second phase. In another embodiment, removal of the first phase from the second bicontinuous structure comprises a process selected from UV degradation, ozone etching, reactive ion etching, chemical etching, and laser ablation.

In one embodiment, shrinking of the third phase of the third bicontinuous structure comprises pyrolysis of the third phase. For example, the third phase can comprise polydimethylsiloxane such that the pyrolysis step converts the polydimethylsiloxane to a silicon oxycarbide.

In another aspect, a method is provided for producing a shrunken replica a multicontinuous structure, wherein the method comprises: (a) providing a first multicontinuous structure which comprises at least a first solid phase and a second phase comprising gas-filled or evacuated interconnected pores; (b) shrinking the first solid phase by a pyrolysis process; (c) infiltrating the pores with a first fluid material; (d) immobilizing the first fluid material to form a second multicontinuous structure which comprises the shrunken first solid phase and a third phase consisting of the immobilized first fluid material; and (e) removing the first solid phase, to yield an shrunken inverse replica which comprises the third phase and a fourth phase consisting of gas-filled or evacuated interconnected pores. Optionally, the method can further comprise (g) shrinking the third phase by a pyrolysis process; (h) infiltrating the pores of the fourth phase with a second fluid material; (i) immobilizing the second fluid material to form a third multicontinuous structure which comprises the shrunken third phase and a fifth phase consisting of the immobilized second fluid material; and (j) removing the shrunken third phase, to yield a shrunken direct replica which comprises the fifth phase and a sixth phase consisting of gas-filled or evacuated interconnected pores.

In yet another aspect, replicas are provided of bicontinuous or other multicontinuous structure made by any of the processes described herein.

DESCRIPTION OF THE INVENTION

Precise shrinkage of a 3D bicontinuous template material to a particular size scale can provide immense benefit in the fabrication of photonic crystals and other structures. A process has been developed for replicating and shrinking a 3D bicontinuous, or multicontinuous, template structure. Advantageously, the process offers a simple method for producing small feature sizes by the use of a larger, more easily fabricated initial template or even a biologically produced initial template. Furthermore, the development of the cyclic size shrinkage scheme allows for the fabrication of arbitrarily small size features.

The template material that undergoes the process will have at least a bicontinuous structure. As used herein, the term "bicontinuous structure" refers to a structure comprising a network of two materials wherein each material is connected to itself throughout the whole material/structure. Multicontinuous structures, such as tricontinuous, tetracontinuous, etc., also may be shrunk and replicated with the processing methods described herein. As used herein, the term "multicontinuous structure" refers to structures having at least three such network materials. The bicontinuous or multicontinuous materials of template structure can be ordered or disordered. All that is generally required is that each material be interconnected throughout the 3D structure, which allows for total removal of the material when needed in the process.

The shrinkage of a template material results alternatively in the inverse or the original (direct) structure and after each process cycle, the structure possesses smaller sample dimensions while replicating the precise complementary structure of each precursor. The cyclic process can be repeated a number of times to shrink a structured template to a desired size scale. The process can be used to make a wide variety of structures for many applications including and beyond photonic crystals.

The processes are useful in the manufacture of structures having complex (i.e., non-planar) feature sizes in the nano- and micro-scale range. Examples of such features include ridges, channels, pores, and protuberances.

As used herein, the terms "comprise," "comprising," "include," and "including" are intended to be open, non-limiting terms, unless the contrary is expressly indicated.

The Shrinkage/Replication Process

The process involves a series of steps that can be repeated in a cyclic fashion to finely control the feature size of the shrunken replica structure. Variations in the steps can be selected depending, for example, on whether a particular network material is or can be shrunken. The steps typically include selective removal of one of the network materials from a structure comprising a pair of interconnected networks to leave an open space that is suitable for infiltration of a new component, infiltration of fluid material into the open space, immobilization of the fluid material, removal of the other network materials, and then shrinkage of the immobilized material.

The original, or initial, template structure that is to be replicated can be obtained from a variety of sources. It can be a naturally occurring structure, i.e., formed by a biological process, such as sea urchin stereom as described in Example 1 below, or it can be manufactured using essentially any process capable of forming a 3D bicontinuous structure. Examples of such manufacturing processes include molding, 3D printing, and other solid free form fabrication techniques. See, e.g., U.S. Pat. No. 6,530,958 to Cima et al., U.S. Pat. No. 6,146,567 to Sachs et al.

Figure 5:
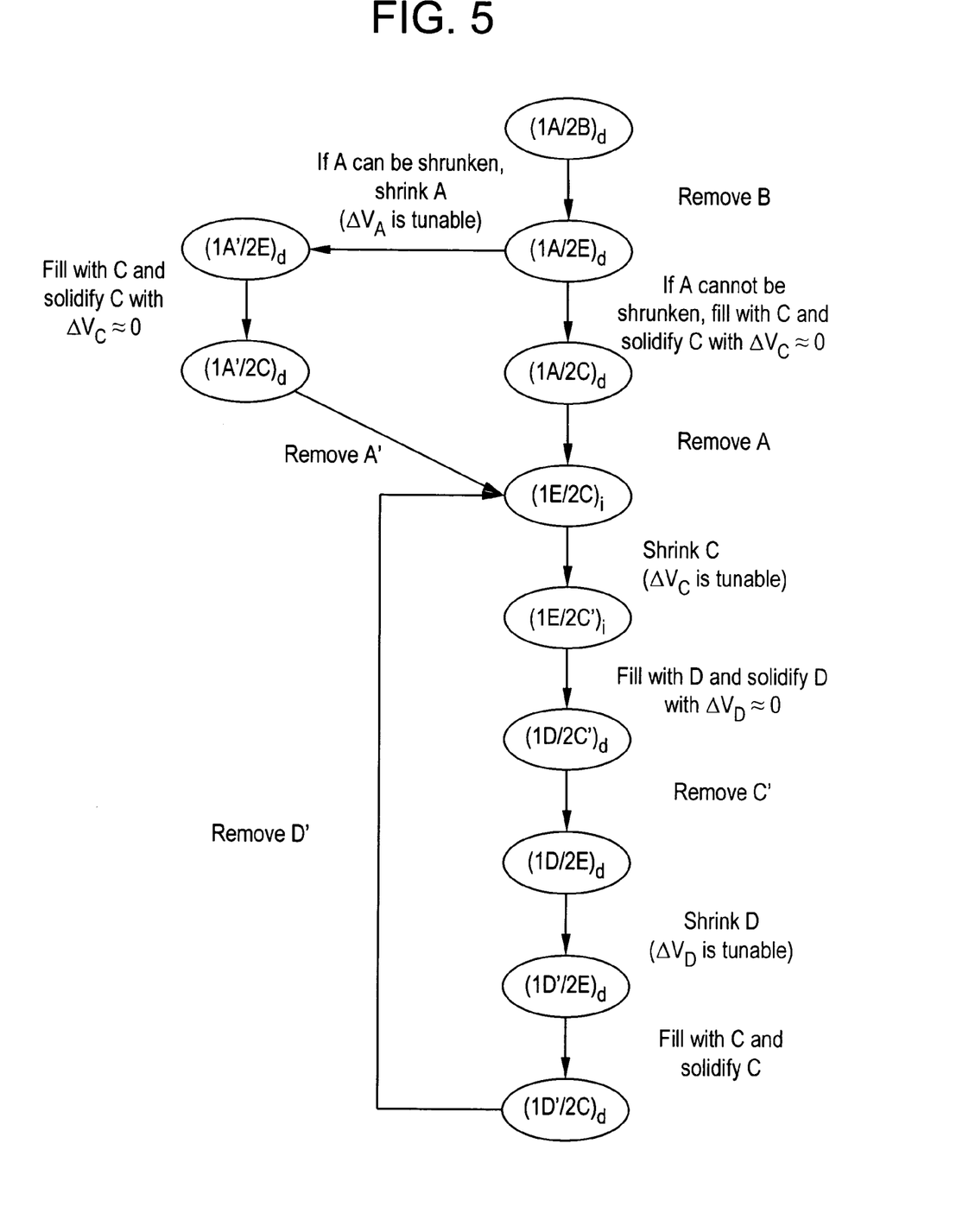
FIG. 5 is a process flow diagram representing another embodiment of the steps and sequences involved in the cyclic replication and shrinkage process described herein.

FIG. 5 is a process flow diagram outlining the steps and cycles in the replication/shrinkage process of a bicontinuous template structure. In this figure, the following nomenclature is used:

$\Delta V$=change in volume
1=first network
2=second network
A=a network filled with a first material
B=a network filled with a second material
C=a network filled with a third material
C'=a network wherein C is shrunken
D=a network filled with a fourth material
D'=a network wherein D is shrunken
E=a network filled with air or other gas or evacuated
$_d$=direct structure, compared to initial template
$_i$=inverse structure, compared to initial template In FIG. 5, the initial template structure is $(1A/2B)_d$, and network 1 is the network structure of interest for replication and shrinkage. The first step is to remove material B, replacing it with a gas- or vacuum-filled space, which results in structure $(1A/2E)_d$. If material A is one that can be shrunken, then it is, which results in $(1A'/2E)_d$. In this case, the degree of shrinkage of volume A $(\Delta V_A)$ is tunable. Then the E network is infiltrated with material C and then material C is immobilized where $\Delta V_C$ is essentially zero, which yields $(1A'/2C)_d$. Material A' is then removed, resulting in $(1E/2C)_i$. Alternatively, if material A cannot be shrunken, then the E network is infiltrated with material C and then material C is immobilized where $\Delta V_C$ is essentially zero. Material A is then removed, also resulting in $(1E/2C)_i$. Next, material C is shrunk, to yield $(1E/2C')_i$, which is a shrunken inverse replica of the initial template network 1. As illustrated, the inverse structure of a bicontinuous structure is another bicontinuous structure. The degree of shrinkage of volume C $(\Delta V_C)$ is tunable. Then, the E network is infiltrated with material D and material D is immobilized where $\Delta V_D$ is essentially zero, which yields $(1D/2C')_d$. Material C' is then removed, to yield $(1D/2E)_d$. Material D is then shrunk, to yield $(1D'/2E)_d$, which is a shrunken direct replica of the initial template network 1. The degree of shrinkage of volume D $(\Delta V_D)$ is tunable. As illustrated, the cycle can be repeated by next infiltrating the E network with a material, material C is shown here (but it could be a different material) and the material C is immobilized where $\Delta V_C$ is essentially zero. Then, material D' is removed, to yield $(1E/2C)_i$.

The process can be used to make shrunken replicas having either the original or inverse structure of the initial template.

In one embodiment, the multicontinuous structure is a tricontinuous material. For example, the initial structure consists of three networks (i.e., component materials) labeled A/B/C, in which network A and network C are separated from one another by network C. In one exemplary method of shrinking and replication, the following steps are carried out: (1) Network B is removed (leaving E1) and backfilled with Material D; (2) Networks A and C are then removed (leaving E2 and E3); (3) Material D is shrunk to D'; and (4) Networks E2 and E3 are then each backfilled with Material F, producing Networks F1 and F2; (5) Material D' is then removed; and (6) Networks F1 and F2 are shrunk, yielding F1' and F2'. This cycle can be repeated. In this example, the resulting structure comprises two different materials, yet has three continuous networks. Generally, there are n-1 networks being filled with n-continuous networks, where the one network not in the n-1 equation is a matrix material interfacing each of the n-1 networks.

Figure 1:
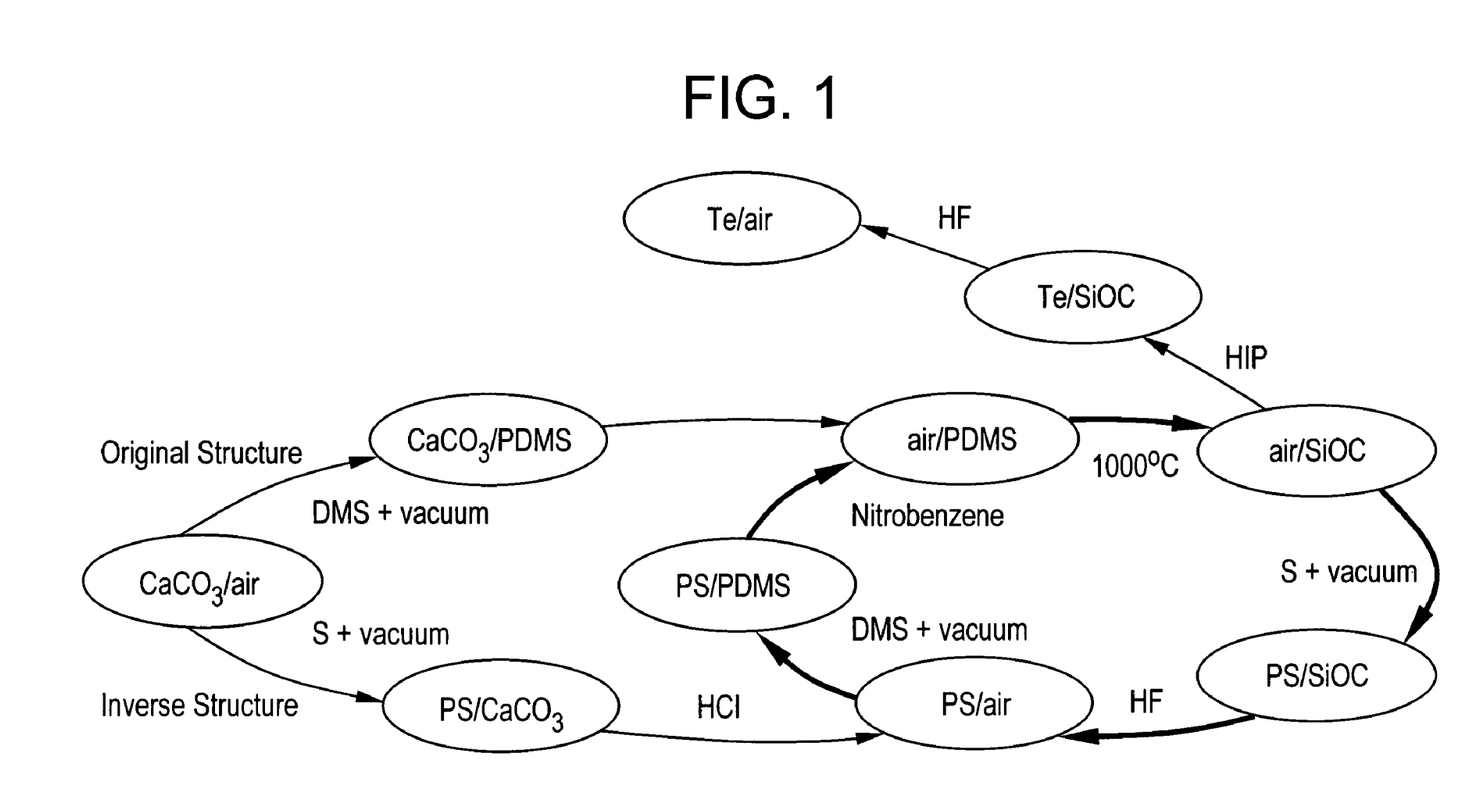
FIG. 1 is a process flow diagram representing one embodiment of the steps and sequences involved in the cyclic replication and shrinkage process described herein.

The general procedure of the cyclic shrinkage process can be further understood with reference to FIG. 1. FIG. 1 illustrates exemplary steps and materials for carrying out the replication of a calcite:air bicontinuous structure into a tellurium:air bicontinuous structure of reduced size, as described further in Examples 1 to 3 below.

Infiltration/Immobilization and Process Materials

The penetrating material is selected such that shrinkage can occur through some subsequent processing operation. Preferably, the penetrating material (e.g., a low viscosity material) can become solid, since the initial template will be preferentially removed, either before or during the shrinkage process. For a bicontinuous structure, the two materials must be able to be preferentially and separately/successively and completely removed. They are mutually insoluble in one another, and have different solubilities or reactivities in a particular solvent, acid, or base so that one of the materials can be selectively dissolved or reacted (and thus removed) while leaving the other material intact. Examples of reaction processing include ozone etching, reactive ion etching, and chemical etching. The remaining material is made to shrink isotropically in a subsequent processing step, so that the structure is preserved throughout each cycle. The amount of size reduction achieved in each shrinkage step can be controlled to yield a desired final amount of shrinkage. This fine tuning can be achieved by the selection of suitable processing and materials parameters, including controlling the ratio of removed parts versus remaining parts in the molecules, processing temperatures, processing times, and the like.

It is anticipated that many variations of the process can be employed by the choice of suitable materials systems. For example, pyrolysis can be performed through a number of different precursors including polysilazanes, poly(isopropyliminoalane), polyborosiloxanes, and other organometallic precursors. Other materials systems may be used so long as one of the material phases can be removed from the other while leaving the structure of the remaining one intact and so long as one of the materials can be processed to undergo an isotropic shrinking process. For example, during any etching or dissolution process, the material not being etched/dissolved should be inert to the etchant/solvent, and any precursor, which shrinks results in a suitable residual material. Variations of the process can provide for the fabrication of a shrunken template of a range of classes of materials, including biological materials, polymers, ceramics, metals, and semiconductors.

The infiltration step (also referred to herein as "backfilling") can conducted with essentially any material that can penetrate into the continuous network and then be immobilized. For example, the infiltration process permits the use of virtually any material which possesses a melting, or flow, temperature that is below the melting point of the remaining phase(s) of the bicontinuous (or multicontinuous) structure. Representative examples of suitable backfilling materials include fluidized monomers, oligomers, and polymers; gases; and molten metals and semi metals. Materials above their glass or melt temperatures in the liquid state may be backfilled and then cooled to solidify them. Gases possibly may be filled into pores in the structure and then reacted to form a solid phase, as is typically performed in chemical vapor deposition ("CVD") processes. Examples of materials that can be deposited by CVD techniques include boron trifluoride, diborane, disilane, and silicon tetrafluoride. Additional examples of backfilling materials include monomeric styrene or methyl methacrylate, which can be immobilized by polymerization to polystyrene or poly(methyl methacrylate) ("PMMA"), respectively. Essentially any monomers that can be subsequently polymerized may be used. Whatever material is used should be able to be readily removed without affecting the pyrolyzing precursor or other components of the continuous structure. For example, the depolymerization (ceiling) temperature of PMMA can be utilized to remove the. PMMA without affecting the PDMS.

Immobilization can be performed by a variety of mechanisms depending on the particular material system being utilized. Examples include a temperature transition (e.g., cooling of molten material below the $T_m$ or $T_g$ temperatures), a chemical reaction (e.g., polymerization, cross-linking), solvent removal (e.g., solvent evaporation), or gelation (e.g., a fluid to gel transition).

In one embodiment, a fluid bicontinuous material, or fluid materials capable of being transformed into bicontinuous material, is itself used as the infiltration material. The fluid material could, for example, be added after the last shrinkage step of a primary bicontinuous structure. After this bicontinuous filler is immobilized, then one of its phases could be removed. This could be useful, for example, to create additional pathways, i.e., interconnected pores, or a combination of differing pores size ranges.

In one example, the initial template structure is a bicontinuous structure of networks A/B which have a 10 micron spacing. Network A is then removed (leaving E1), Network B is shrunk, and then E1 is backfilled with a material such as a mixture of polystyrene/polyethylene oxide block copolymer with ceramic (e.g., silicate) precursors, which can be converted to a bicontinuous material (ceramic and polymer). In one embodiment, the polymer can be selectively removed to make additional pores (less than 10 micron in size), further increasing the porosity of the overall structure. The structure can be subjected to additional replication and shrinkage using the methods described herein. In one application, the methodology can be used to make a filter material having two different pore sizes.

Component Removal

Selected phases or materials of the continuous structure may be selectively (i.e., preferentially) removed by a variety of techniques. Essentially any process of preferential removal of one network over the other network(s) can be used. Examples include dissolution or etching with an appropriate solvent (hydrochloric acid, hydrofluoric acid), melting, UV degradation, ozone etching, reactive ion etching, chemical etching, laser ablation, or any other technique which imparts certain energy to the material and initiates the removal of components. All of these various techniques may be utilized provided they afford selective removal of one material over others that are present.

Shrinking

The shrinking materials and methods permit partial mass removal, e.g., removal of certain chemical functionalities, while leaving a solid residual component. Preferably, the shrinking process includes a reaction that generates a gas, because a gas is easily removed from the residual solid structure. Essentially any processing method that facilitates this result can be used. Pyrolysis is a preferred method. Other methods of shrinkage include ozonolysis, UV degradation, polymerization, and chemical reactions. For example, a bicontinuous structure made of component A and component B could be treated to cause component A to undergo a reaction to convert it to component A' where the volume of component A' is less than the volume of component A. The reaction of component A results in a loss of mass, the mass being withdrawn, or driven off, as liquid or gas.

The amount of material that is removed during the shrinkage process theoretically dictates the amount of shrinkage that is possible. Therefore, if the residues were 10% of the whole material, then the theoretical shrinkage would be 90%. In some embodiments, excess shrinkage levels can result in structural instability. Accordingly, the amount of shrinkage selected for a single cycle may need to be adjusted to maintain sufficient stability.

In preferred embodiments, the materials system is selected to allow the continual shrinkage of the structure through a cyclic pyrolysis operation.

In the cyclic shrinkage process, the same materials need not be used repeatedly in each cycle. Different materials or combinations of materials can be used in subsequent cycles of a replication process. Different degrees of shrinkage can be obtained in each successive cycle to enhance the tunability of the process. For instance, one can improve the versatility and control of the overall shrinkage process when the first cycle gives x % shrinkage, the second cycle gives y% shrinkage, and third cycle gives z % shrinkage, in contrast to a process in which each of three cycles gives only x % shrinkage.

Through appropriate selection and design of materials, the process allows repeated shrinkage, continually reducing the size scale of the template with minimal detrimental side effects, such as cracking. For example, through the control of pyrolysis temperature or the choice of the precursor or both, a wide range of shrinkage can be obtained at each shrinkage step, e.g., at least about 1% to about 90% volumetrically. For example, an isotropic linear shrinkage of 50% in a cube results in a volumetric shrinkage of 87.5%. In addition, through the choice of appropriate precursor which becomes pyrolyzed, the backfilling is possible with essentially any type of material, so long as the pyrolyzed bicontinuous template does not melt or flow or degrade at the necessary processing temperatures.

Uses of the Shrinkage/Replication Process

The processes described herein can be used replicate a wide variety of bicontinuous structures for a variety of purposes, including microphotonics, electronics, and MEMS, and nanomechanics applications. In one embodiment, the processes described herein are used to make photonic crystals, particularly ones able to access the mid-IR reflectivity and which provide a high dielectric contrast structure with low absorption in the IR. A wide variety of other applications are envisioned. For example, the replication/shrinkage processes could be used to make mechanical composites of smaller feature sizes, porous membranes with controlled porosity (e.g., for chemical purification), optical devices (e.g., gratings, sensors, actuators, lenses), tissue engineering matrices, and catalytic components and valves for aircraft and automobiles.

The process can be applied to disordered structures. Examples of disordered structures include labyrinthine or sandstone structures. Shrinkage of channels would be useful, for example, to provide specific size filtration in a disordered but continuous material.

The methods, compositions, and articles of manufacture described above will be further understood with reference to the following non-limiting examples.

EXAMPLE 1

Replication and Shrinkage of a Sea Urchin Stereom Using Polymeric Backfill Materials A sea urchin stereom from the *Phyllacanthus* interambulacral plates, which possesses a calcite:air bicontinuous structure having a unit cell with a lattice parameter of approximately 30 microns was used as the original, or initial, structural template. Poly(dimethyl siloxane) ("PDMS") was used as the first backfill material. It was filled into the template in its oligomeric form (Sylgard 184, 10:1 mixture of oligomer:crosslinker) using vacuum and then was thermally crosslinked at 70° C. for about one hour, yielding a calcite:PDMS structure.

Next, the calcite was removed from the calcite:PDMS structure by immersion in hydrochloric acid, which reacts preferentially with the calcite ($CaCO_3+2HCl \rightarrow CO_2+H_2O+CaCl_2$) to produce an air:PDMS structure. The air:PDMS structure was the inverse structure (an inverse replica) of the sea urchin stereom.

Figure 2:
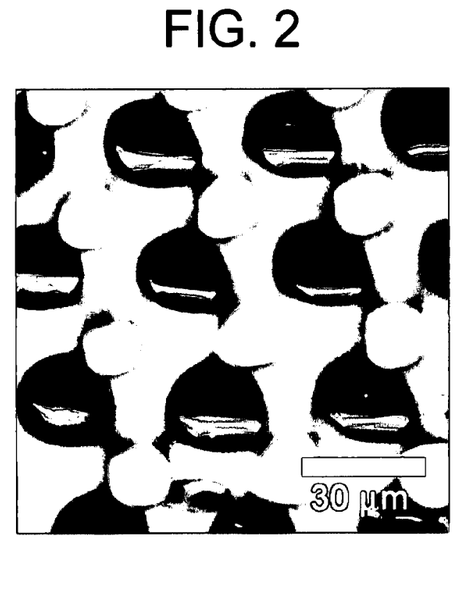
FIG. 2 is an SEM image of a magnesium calcite:air structure from a sea urchin stereom. The view depicts the (100) crystal facet.
Figure 3:
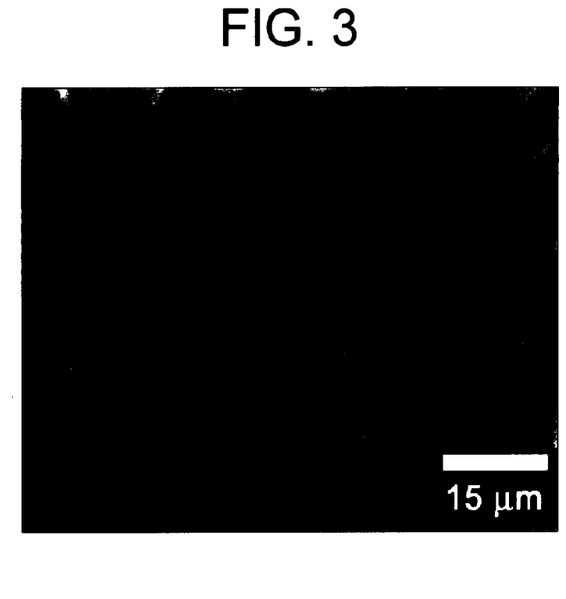
FIG. 3 is an SEM image of a pyrolyzed SiOC:air structure, which is an inverse replica of the structure shown in FIG. 2. The view depicts the (100) crystal facet, with about a 50% linear decrease in the lattice spacing from the original sea urchin.
Figure 4:
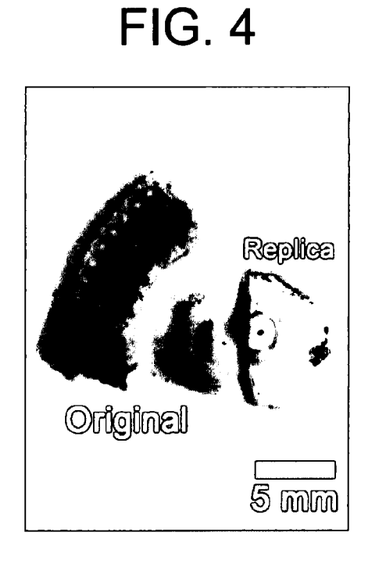
FIG. 4 is a photograph depicting two pieces from a bicontinuous structure sample, wherein the piece on the right has been shrunk and replicated and the piece on the left is the original structure. Comparison of the pieces illustrates the structural fidelity achieved over the entire sample following the replication and shrinking process.

The air:PDMS structure was then subjected to pyrolysis in an air tube furnace by ramping the temperature up to 1000° C. and back down to room temperature at 100° C./hr rate, causing isotropic shrinkage of the bicontinuous replica and forming a shrunken air:silicon oxycarbide (SiOC) network structure. The shrinkage during pyrolysis of the structure was visually verified. SEM and optical microscopy pictures comparing the initial template with the pyrolyzed template clearly show a linear shrinkage of approximately 50%. It was observed that the replica maintained a high global fidelity during the pyrolysis step. See FIGS. 2-4.

Next, the shrunken template was backfilled with polystyrene ("PS") by filling the template with styrene monomer using vacuum and then thermally polymerized at 100° C. overnight, yielding a PS:SiOC structure.

The removal of SiOC silica was then carried out by immersion in a hydrofluoric acid bath, which preferentially etched the SiOC without affecting the PS, resulting in a PS:air structure.

Next, dimethyl siloxane ("DMS") prepolymer was backfilled into the PS:air structure under vacuum and then thermally polymerized to form PDMS, yielding a PS:PDMS structure. The PS was then preferentially removed by dissolution in a nitrobenzene bath, which selectively dissolved the PS without affecting the PDMS, resulting in another air:PDMS structure suitable for pyrolysis and further shrinkage. As illustrated in FIG. 1, the above steps can be repeated cyclically for continual size shrinkage until the desired size scale is achieved.

At each step, the preferentially removal of the desired material was verified using SEM of numerous random fracture/cut surfaces. For example, hydrochloric acid preferentially etched calcite (not the PDMS), hydrofluoric acid etched the SiOC (not the PS), and nitrobenzene preferentially dissolved the PS (not the PDMS).

EXAMPLE 2

Inverse Replication and Shrinkage of a Sea Urchin Stereom

As in Example 1, a sea urchin stereom, which possesses a calcite:air bicontinuous structure was used as the original structural template. Styrene monomer was backfilled into the template using vacuum and then thermally polymerized at 100° C. overnight, yielding a calcite:PS structure. The calcite was then removed by dissolution in hydrochloric acid, resulting in an air:PS structure.

Next, dimethyl siloxane prepolymer was backfilled into the air:PS structure under vacuum and then thermally polymerized to form PDMS, yielding a PDMS:PS structure. The PS was then removed by dissolution using nitrobenzene, resulting in a PDMS:air structure.

The PDMS:air structure was then subjected to pyrolysis by ramping the temperature up to 1000° C. and back down to room temperature at 100° C./hr rate in an air tube furnace, causing isotropic shrinkage of the bicontinuous replica and forming a shrunken SiOC:air network structure, which was a smaller but exact replica of the original structure.

EXAMPLE 3

Replication and Shrinkage of a Sea Urchin Stereom Using Tellurium Backfill Material An air:silicon oxycarbide template was produced as described in Example 1. After one complete cyclic reduction (two pyrolysis steps), the lattice parameter, a, becomes about 8 μm. This template was then backfilled with tellurium ($T_m$=450° C.) by placing the template in vacuum, melting a quantity of tellurium at 500° C. under vacuum, and applying hot isostatic pressure (up to 10,000 psi) which completely infiltrated the air:SiOC network structure. Complete infiltration of the tellurium into all of the interconnected pores of the template was verified by backscattered electron SEM imaging. The silica was then etched away using hydrofluoric acid, resulting in a freestanding Te:air structure having the desired length scale, high dielectric contrast structure having negligible absorption over a wide range of infrared wavelengths.

Pure tellurium exhibits a spectrally insensitive reflectance of 46% for wavelengths from 5 to 40 μm. A tellurium:SiOC replica also does not exhibit major spectral features, due to the inadequate dielectric contrast between the interpenetrating structures ($n_1:n_2$~4.6:2) and the high absorption of SiOC over this spectral region. In contrast, the tellurium:air replica exhibited a sharp reflection around 33 μm and a mean reflectance elsewhere approximately half of pure tellurium (25% v. 46%). This is in close agreement with the structural fraction of tellurium in the replica. The results demonstrate that a naturally occurring 3D bicontinuous structure can be engineered in a top-down fashion to create low absorption, high dielectric contrast photonic crystals with a stop band in the mid-IR regime. This cyclic reduction-infiltration approach should permit fabrication of a wide variety of 3D bicontinuous photonic crystals based on the many periodic structures.

EXAMPLE 4

Replication Process Including Fluid-to-Gel Transition

First, a 3D interconnected structure would be fabricated utilizing a rapid prototyping technique, such as 3D printing in which computer aided design software is used to control printing in three dimensions of a desired continuous structure. The fabricated 3D structure could possess crystallographic symmetry, although that would not be required. The printing material would include polyacrylic acid coated $BaTiO_3$ nanoparticles, which in the presence of salt (effectively changing pH or ionic strength) would cause the nanoparticles to induce a fluid-to-gel transition. That is, the structure of the particles would be built up and then exposed to a salt solution to cause the particles to gel together, forming an interconnected network. Then, the resulting bicontinuous structure (gel phase:air phase) would be infiltrated with a DMS fluid, which would then by immobilized by polymerization to PDMS. Next, the gel:PDMS structure would be placed into deionized water to dissolve and remove the gel phase, to yield an inverse replica of the original manufactured 3D template structure.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

We claim:

1. A method for producing a shrunken replica or a shrunken inverse replica of a multicontinuous or bicontinuous structure, the method comprising:

infiltrating a first multicontinuous or bicontinuous structure with a first fluid material which can be immobilized and shrunken, wherein the first multicontinuous or bicontinuous structure comprises at least a first phase and a second phase which is immiscible with the first phase, and the infiltration displaces the second phase in the first multicontinuous or bicontinuous structure to form a second multicontinuous or bicontinuous structure which comprises at least the first phase and a third phase which consists of the first fluid material;

immobilizing the infiltrated first fluid material in the second multicontinuous or bicontinuous structure;

removing the first phase from the second multicontinuous or bicontinuous structure;

shrinking the third phase of the second multicontinuous or bicontinuous structure, to produce an isotropically shrunken inverse replica of the first multicontinuous or bicontinuous structure;

infiltrating the shrunken inverse replica with a second fluid material which can be immobilized, wherein the shrunken inverse replica comprises at least a fourth phase and a fifth phase which is immiscible with the fourth phase, and the infiltration displaces the fifth phase of the shrunken inverse replica to form a third multicontinuous or bicontinuous structure which comprises the fourth phase and a sixth phase which consists of the second fluid material which is immiscible with the fourth phase; and immobilizing the infiltrated second fluid material in the third multicontinuous or bicontinuous structure.

2. The method of claim 1, further comprising removing the fourth phase from the third multicontinuous or bicontinuous structure, to produce an isotropically shrunken direct replica of the first multicontinuous or bicontinuous structure.

3. The method of claim 2, further comprising:

infiltrating the isotropically shrunken direct replica with a third fluid material which can be immobilized and shrunken, wherein the isotropically shrunken direct replica comprises at least a seventh phase and an eighth phase which is immiscible with the seventh phase, and the infiltration displaces the eight phase in the isotropically shrunken direct replica to form a fourth multicontinuous or bicontinuous structure which comprises at least the seventh phase and a ninth phase which consists of the third fluid material;

immobilizing the infiltrated third fluid material in the fourth multicontinuous or bicontinuous structure;

removing at least the seventh phase from the fourth multicontinuous or bicontinuous structure; and shrinking the ninth phase of the shrunken replica, to produce a second isotropically shrunken inverse replica of the first multicontinuous or bicontinuous structure.

4. The method of claim 1, wherein the multicontinuous or bicontinuous structure is an ordered bicontinuous structure or a disordered bicontinuous structure.

5. The method of claim 1, wherein the first multicontinuous or bicontinuous structure is formed by a molding process, a solid free form fabrication process, or a biological process.

6. The method of claim 1, wherein the volume of the inverse replica is between about 1% and about 90% of the volume of the first multicontinuous or bicontinuous structure.

7. The method of claim 1, wherein the first fluid material which can be immobilized and shrunken comprises a monomer or other polymer precursor.

8. The method of claim 7, wherein the polymer precursor comprises an organometallic precursor.

9. The method of claim 7, wherein the polymer precursor is a precursor of polysilazanes, poly(isopropyliminoalane), or polyborosiloxanes.

10. The method of claim 7, wherein the polymer precursor comprises dimethyl siloxane.

11. The method of claim 7, wherein the immobilization comprises polymerizing or crosslinking the monomer or polymer precursor.

12. The method of claim 1, wherein the second fluid material comprises a molten metal or semi-metal.

13. The method of claim 12, wherein the immobilization comprises freezing the metal.

14. The method of claim 1, wherein the second fluid material comprises a monomer or other polymer precursor.

15. The method of claim 3, wherein the first fluid material and the third fluid material each comprise the same polymer precursor.

16. The method of claim 1, wherein the second phase is air or another gas and the infiltration is conducted under vacuum conditions.

17. The method of claim 1, wherein the removal of the first phase from the second multicontinuous or bicontinuous structure comprises removing the first phase with a solvent which is a nonsolvent for the third phase.

18. The method of claim 1, wherein the removal of the first phase from the second multicontinuous or bicontinuous structure comprises a process selected from the group consisting of UV degradation, ozone etching, reactive ion etching, chemical etching, and laser ablation.

19. The method of claim 1, wherein the shrinking of the third phase of the second multicontinuous or bicontinuous structure comprises pyrolysis of the third phase.

20. The method of claim 19, wherein the third phase comprises polydimethylsiloxane and the pyrolysis converts the polydimethylsiloxane to a silicon oxycarbide.

21. The method of claim 1, wherein the infiltration of the first fluid material comprises a gas phase deposition process.

22. A method for producing a shrunken replica of a bicontinuous structure, the method comprising:

infiltrating a first bicontinuous structure with a first fluid material which can be immobilized, wherein the first bicontinuous structure comprises a first phase and a second phase which is immiscible with the first phase, the infiltrating displacing the second phase in the first bicontinuous structure to form a second bicontinuous structure which comprises the first phase and a third phase which consists of the first fluid material which is immiscible with the first phase;

immobilizing the infiltrated first fluid material in the second bicontinuous structure;

removing the first phase from the second bicontinuous structure, to produce an inverse replica of the first bicontinuous structure;

infiltrating the inverse replica with a second fluid material which can be immobilized and shrunken, wherein the inverse replica comprises at least a fourth phase and a fifth phase which is immiscible with the fourth phase, and the infiltration displaces the fifth phase of the inverse replica to form a third bicontinuous structure which comprises the fourth phase and a sixth phase;

immobilizing the infiltrated second fluid material in the third bicontinuous structure;

removing the fourth phase from the third bicontinuous structure; and shrinking the sixth phase of the third bicontinuous structure, to produce an isotropically shrunken replica of the first bicontinuous structure.

23. The method of claim 22, further comprising:

infiltrating the isotropically shrunken replica with a third fluid material which can be immobilized, wherein the isotropicalilv shrunken replica comprises at least a seventh phase and an eighth phase which is immiscible with the seventh phase, and the infiltration displaces the eighth phase of the shrunken replica to form a fourth bicontinuous structure which comprises the seventh phase and a ninth phase; and immobilizing the infiltrated third fluid material in the fourth bicontinuous structure.

24. The method of claim 23, further comprising removing the seventh phase from the fourth bicontinuous structure, to produce an isotropically shrunken inverse replica of the first bicontinuous structure.

25. The method of claim 22, wherein the first bicontinuous structure is formed by a molding process, a solid free form fabrication process, or a biological process.

26. The method of claim 22, wherein the volume of the shrunken replica is between about 1% and about 90% of the volume of the first bicontinuous structure.

27. The method of claim 22, wherein the first fluid material which can be immobilized and shrunken comprises a monomer or other polymer precursor.

28. The method of claim 27, wherein the polymer precursor comprises an organometallic precursor.

29. The method of claim 27, wherein the polymer precursor is a precursor of polysilazanes, poly(isopropyliminoalane), or polyborosiloxanes.

30. The method of claim 27, wherein the polymer precursor comprises dimethyl siloxane.

31. The method of claim 27, wherein the immobilization comprises polymerizing or crosslinking the monomer or polymer precursor.

32. The method of claim 22, wherein the second fluid material comprises a molten metal or semi-metal.

33. The method of claim 32, wherein the immobilization comprises freezing the metal.

34. The method of claim 22, wherein the second fluid material comprises a monomer or other polymer precursor.

35. The method of claim 22, wherein the first fluid material and the third fluid material each comprise the same polymer precursor.

36. The method of claim 22, wherein the second phase is air or another gas and the infiltration is conducted under vacuum conditions.

37. The method of claim 22, wherein the removal of the first phase from the second bicontinuous structure comprises removing the first phase with a solvent which is a nonsolvent for the second phase.

38. The method of claim 22, wherein the removal of the first phase from the second bicontinuous structure comprises a process selected from the group consisting of UV degradation, ozone etching, reactive ion etching, chemical etching, and laser ablation.

39. The method of claim 23, wherein the shrinking of the third phase of the third bicontinuous structure comprises pyrolysis of the third phase.

40. The method of claim 39, wherein the third phase comprises polydimethylsiloxane and the pyrolysis converts the polydimethylsiloxane to a silicon oxycarbide.

41. The method of claim 22, wherein the infiltration of the first fluid material comprises a gas phase deposition process.

42. A method for producing a shrunken replica of a bicontinuous structure, the method comprising:
   (a) providing a first bicontinuous structure which comprises at least a first solid phase and a second phase comprising gas-filled or evacuated interconnected pores;
   (b) shrinking the first solid phase by a pyrolysis process;
   (c) infiltrating the pores with a first fluid material;
   (d) immobilizing the first fluid material to form a second bicontinuous structure which comprises the shrunken first solid phase and a third phase consisting of the immobilized first fluid material; and
   (e) removing the first solid phase, to yield a shrunken inverse replica which comprises the third phase and a fourth phase consisting of gas-filled or evacuated interconnected pores;
   (f) shrinking the third phase by a pyrolysis process;
   (g) infiltrating the pores of the fourth phase with a second fluid material;
   (h) immobilizing the second fluid material to form a third bicontinuous structure which comprises the shrunken third phase and a fifth phase consisting of the immobilized second fluid material; and
   (i) removing the shrunken third phase, to yield a shrunken direct replica which comprises the fifth phase and a sixth phase consisting of gas-filled or evacuated interconnected pores.

* * * * *